Figure 1:
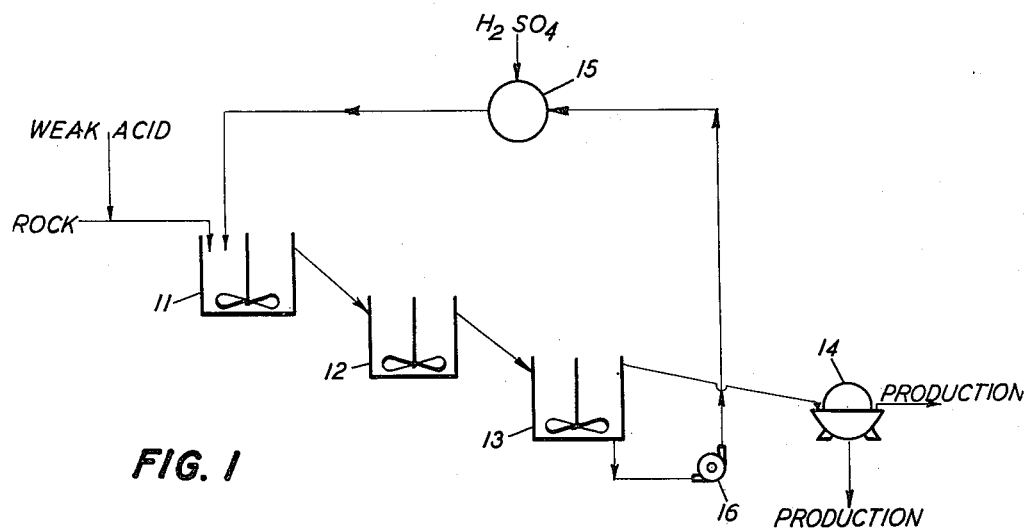

July 28, 1936.  W. C. WEBER ET AL  2,049,032
PREPARATION OF PHOSPHORIC ACID
Original Filed July 2, 1932   2 Sheets-Sheet 1

INVENTORS
WILLIAM C. WEBER
RALPH W. SHAFOR
ELLIOTT J. ROBERTS
BY
ATTORNEYS.

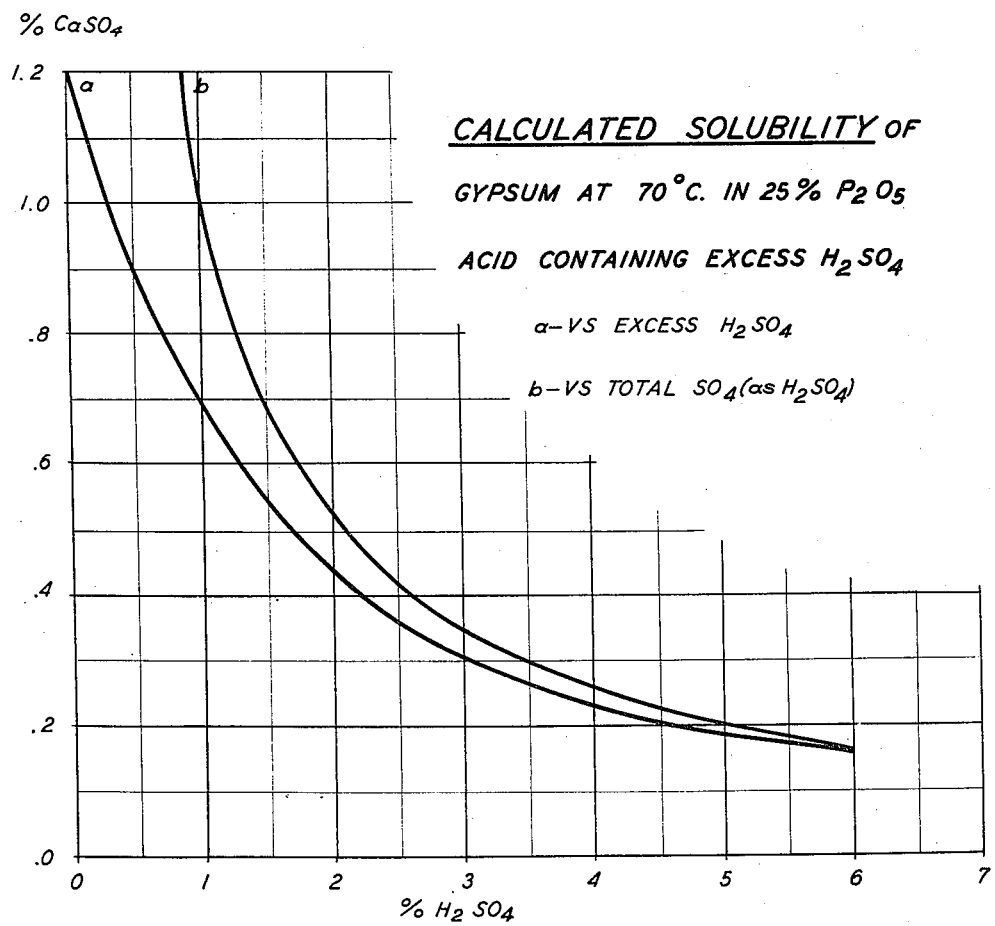

Patented July 28, 1936

2,049,032

UNITED STATES PATENT OFFICE 2,049,032

PREPARATION OF PHOSPHORIC ACID

William C. Weber, Larchmont, Ralph W. Shafor, New York, N. Y., and Elliott J. Roberts, Westport, Conn., assignors to The Dorr Company, Inc., New York, N. Y., a corporation of Delaware Application July 2, 1932, Serial No. 620,638
Renewed December 13, 1935

7 Claims. (Cl. 23—165)

This invention relates generally to crystallization or the control of crystal size and characteristics of a solid reaction product resulting from the interaction of a solid and a liquid. The reaction may also be between two reagents of which one is less soluble and the other is more soluble.

The object of this invention is to identify and control those factors which in commercial operation will cause the solid to be produced dependably in an easily separable or filtrable form. Another object of the invention is to produce the solid reaction product in the form of fewer but uniformly large crystals instead of the usual many but smaller crystals. A further object is to so carry out the process hereof that a high percentage extraction of the solid reagent will be obtained. A still further object is to produce more concentrated phosphoric acid than has heretofore been possible. Another object is to carry out this invention in a continuous manner.

The nature of this invention resides in controlling the size and uniformity of crystals resulting from the reaction between the liquid and solid reagents. It consists in controlling or restricting the urge of the solid reaction product to precipitate or crystallize, because it has been observed that the greater the urge to crystallize, the greater is the number of crystals formed; and the greater the number of crystals formed, the smaller is the size of each. However, the aim of this invention is to produce fewer but larger crystals. Thus it becomes important to control the urge to precipitate for it controls the number of crystal nuclei formed and therefore the size of crystal obtained. Urge to precipitate may be defined as a function of the quantity of precipitatable material in solution at any moment. This urge is controlled, and the desired type of crystal formation is obtained, when precipitation takes place in a solution under conditions wherein the concentration of the liquid reagent is small but yet sufficient to be equal to, or in excess of, the requirements of the reaction, at least during the major part thereof.

Still another feature of the invention resides in the requirement that upon the addition of the liquid reagent, there should be present in the solution to which this reagent is added, a concentration of this reagent which is equivalent to, or in excess of the other component of the solid reaction product. This condition is conducive also to the formation of large crystals.

And further, the invention when applied to the manufacture of phosphoric acid includes the feature of simultaneously, or at least in a single step, dissolving the phosphate rock in the dissolving acid and forthwith precipitating the reaction solid by having present an excess of the precipitating agent. That is, the invention teaches that as fast as the solid reagent, or rock, dissolves, it should have the solid reaction product precipitated out from the solution. The invention therefore may be said to be carried out when phosphate rock is dissolved in a rock solvent such as an acid and a crystalline solid is substantially forthwith precipitated from the resulting solution under conditions to obtain a minimum number of crystals with each having a substantially maximum size. These conditions may be described as including the presence of a substantially uniform and low concentration of $SO_4$ in excess of the requirements for precipitation.

The invention possesses other objects and features of advantage, some of which, with the foregoing, will be set forth in the following description of our invention. In the manufacture of phosphatic fertilizers from phosphate rock, the rock may be prepared by wet grinding the rock in a part of the produced acid liquor or liquor returned from the washing of the solid reaction product. After the grinding and partial dissolution of the rock by the liquor in which it is ground, there is added thereto subsequently, a precipitant or reactable liquid reagent such as sulfuric acid to bring about a reaction between the phosphate and acid liquor to convert the mixture into phosphoric acid and some form of calcium sulfate. The form of the calcium sulfate obtained such as semi-hydrate, dihydrate or anhydrite is dependent upon the temperature used and the concentration of the solution, or both. The solid calcium sulfate must then be separated from the phosphoric acid, and it is this separation that the present invention relates to, for its object is to make this step easier to carry out. Accordingly, this invention pertains to the control of a desirable crystal size and formation of calcium sulfate which can be dependably filtered or otherwise separated from the phosphoric acid under commercial conditions.

The first step of this invention in accomplishing its results is to maintain the concentration of reactable liquid reagent as low as commercially feasible during all stages of the reaction. This is accomplished by diluting the reacting reagents with completely reacted and therefore inert reaction products. This may be commercially practiced by returning or circulating to the reaction zone or zones a volume of finished reaction slurry, preferably many times as large as the quantity of reagents.

The second step of this invention in accomplishing its results in a specific mode of carrying it out is to assure the dissolving of the phosphate rock into solution by the solvent or acid in the presence of a reagent or precipitant which will precipitate the lime from the solution as calcium sulfate with the crystals thereof meeting certain requirements. That is, the step of dissolving the rock and the step of precipitating a solid therefrom should take place together and as near simultaneously or concurrently as practical operation will permit, so to this end it is necessary to mix the rock with a rock-dissolving substance or acid and a precipitating reactant. However, precipitation of the proper sized crystals will not take place except under certain conditions. If all of the precipitatable matter is attempted to be precipitated at once, or in one place, by having enough of the precipitating agent present, there is set up a terrific urge to precipitate. This urge must be controlled and modified so that the tendency of the gypsum to precipitate may not be too great.

Since the liquid reagent is already a solution, its concentration can be best kept low by dilution, as already explained. The solid reagent, however, must dissolve or go into solution before it can react and be precipitated. The extent to which such solution can take place is quite considerable if there is no liquid reagent present or if the quantity of liquid reagent available is insufficient to satisfy all of the available solid reagent. In this case, when the two dissolved reagents are brought together there is a very large amount of precipitatable material per unit volume and therefore a terrific urge to precipitate. On the other hand, if there is always present a quantity of liquid reagent in excess of the amount required to react with the solid reagent, the latter can only dissolve to a very limited extent before it is forthwith, or practically simultaneously, precipitated. The amount of precipitatable matter present in solution at any moment is therefore limited and accordingly the urge to precipitate is very slight. As has been previously pointed out the number of new crystal nuclei formed is more or less directly proportional to the urge to precipitate, so as the urge to precipitate is slight, the number of new crystal nuclei formed is low.

The third step of this invention in accomplishing its results is to maintain a small urge to precipitate when adding the liquid reagent. The solubility of the solid reaction product decreases with increasing concentration of the liquid reagent. If therefore, the liquid reagent be added to a pulp or slurry which already contains an appreciable excess of the same reagent, the resulting urge to precipitate will be very much less than if it were added to a pulp which contained only a very slight excess or deficiency of the reagent. Obviously, the urge to precipitate may also be very materially reduced by adding the liquid reagent gradually or in stages. Similarly, the H₂SO₄ may be diluted with a weak or strong acid before it is added to the slurry.

A fourth step of this invention in accomplishing its results is to control the crystal form and characteristics by dissolving only a certain or limited amount of rock in one stage or container and then having present in that stage an amount of precipitating agent provided with an excess of SO₄ ions to satisfy all of the limited urge to precipitate in that stage. Thus, there is restricted and controlled the amount of available precipitatable materials per unit volume in any one stage, and then it is seen to that substantially all of that precipitatable material is precipitated therein or satisfied. Instead of permitting a rush to precipitate of a large amount of precipitatable matter all in one place, the precipitating action is diluted, so to speak, and spread out so there is not too much of it in any one place. But not only is it important in practice to spread out the step of precipitating preferably through a number of stages or containers (although the spreading may be done in a single container) it is equally important that there be no greater urge to precipitate in one area or zone than in any other. This very thing will happen if the precipitating agent is not thoroughly diffused throughout its container. Therefore, this condition must be prevented and it be made sure that the precipitating reagent has a uniform concentration all through the container where precipitation is to take place.

Figure 2:
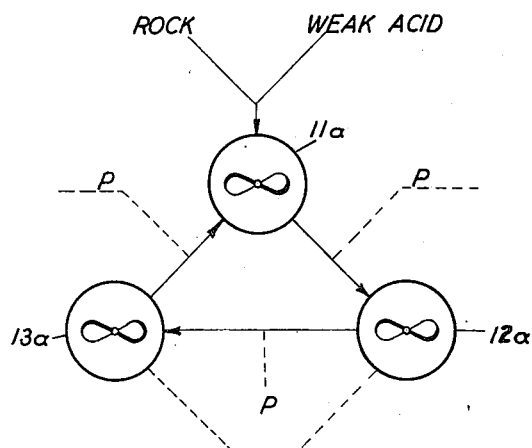

The invention may be more clearly understood by referring to the accompanying drawings in which flowsheets are shown for the purpose of illustration. In the drawings, Figure 1 is a flowsheet representing one method of associating or hooking up the devices commonly used in the treatment of phosphate rock for making commercial phosphatic fertilizers. Figure 2 shows a modified form. Figure 3 is a graph showing the solubility of a solid calcium sulfate such as gypsum under varying conditions.

Referring to the drawings, 11, 12, 13 and 15 represent a plurality of reaction stages or containers, provided with some form of stirring device, so placed with respect to each other that the overflow of the stage, container or mixer 11 can flow into stage, container or mixer 12, and so on down to stage or mixer 13. Phosphate rock, suitably ground, is added to mixer 11 to which is also added a rock-dissolving solvent or acid, and a precipitating reagent. The resulting mixture or slurry flows from stage or mixer 11 into stage or mixer 12 and from 12 to 13.

Some of the mixture or slurry from mixer 13 is led to a filter 14 or other means of separation such as a thickener where the crystallized solids are removed from their acid, with the acid going to production or desired subsequent treatment, and the filter cake of crystals going to discharge, to further washing or use. Another portion of the mixture or slurry of unseparated reaction products goes from the mixer 13 to be mixed with a precipitating agent or reactant like H₂SO₄ at any suitable station such as at 15 and the unseparated reaction products plus acid are returned as slurry to mixer 11.

In this arrangement the return or circulation of more or less inert reaction products from container 13 so dilutes the liquid reagent or H₂SO₄, added to container 15 that the rock dissolving solvent H₃PO₄ added to container 11, contains a very low concentration of H₂SO₄ and hence the urge to precipitate in container 11 is very slight.

Further, by this arrangement, the quantity of liquid reagent added to container 15 and the quantity of reaction products circulated by pump 16 can be and are so regulated that there is always an excess of liquid reagent in the containers 11, 12 and 13. Thereby the dissolving of the phosphate rock or CaO into solution by the solvent or phosphoric acid in containers 11, 12 and 13 is accomplished in the presence of excess H₂SO₄ with the result that the formed calcium sulfate preferably as gypsum is precipitated forthwith or practically instantaneously and the concentration of CaO in solution and therefore the urge to precipitate is maintained very low.

Still further, by this arrangement an excess of $H_2SO_4$ over that corresponding to the CaO is maintained in the reaction products leaving container 13 and the concentration of dissolved CaO or calcium sulfate in the slurry returned to container 15 is very low. Thereby the urge to precipitate in container 15, when the precipitating reagent is added, is very slight.

Still further, by this arrangement some dissolution of the phosphate rock by the phosphoric acid takes place in stage or container 11 but because of the presence therein of an excess of precipitating reagent or reactant, as soon as the rock is dissolved, the solution is acted upon by the precipitating reagent, to precipitate at that time whatever amount of precipitatable matter is present in the solution. As the amount of precipitatable matter present has been controlled and is relatively small, the urge to precipitate is likewise small, and larger crystals are thus produced.

From container 11 the agitated mixture of undissolved rock, dissolving acid, precipitating reactant, and crystals is flowed to container 12. Here the dissolution of the rock continues due to the presence of some dissolving acid and the newly produced solution is promptly acted upon by the excess of precipitating reagent or reactant present to precipitate the precipitatable matter out of the solution. As in the case of container 11, the amount of the precipitatable matter is relatively small, so in the presence of ample precipitating reactant, the precipitate is formed into crystals of desired size, for the urge to crystallize is limited, for the amount of precipitatable matter present is limited.

Then the mixture in container or mixer 12 is flowed to mixer 13, just as the mixture from mixer 11 is flowed to mixer 12, and there is duplicated in mixer 13 the actions and reactions as described for mixer 12. These reactions are shown and described as taking place step-wise or progressively in a plurality of different zones, stages or containers. The number is unimportant for local conditions must govern. The ideal condition would be to have the reactions take place concurrently in one container so our aim is to have them take place in the least number of zones or stages that commercial and local conditions will permit.

A quantity of the mixture from the final mixer 13 is conveyed to a separating device such as a sedimentation apparatus or a filter 14 where the calcium sulfate or gypsum crystals are separated from the phosphoric acid, with each going separately to production or subsequent treatment or use.

Another quantity of the mixture from the final mixer 13 is caused to return to the initial mixer 11 such as by means of a pump 16 to assure mixing of some of the reaction products with the reagent or reactant. In returning to the initial mixer 11, the mixture preferably passes through a station 15 where a precipitating acid is added such as $H_2SO_4$.

The actual mechanical arrangement is subject to many modifications for each of the ingredients added to the circuit or system may be added at a variety of points. This is so because it will be observed that the circuit is a closed one and therefore cyclic. Figure 2 is shown to bring out the fact that the circuit is cyclic; that the actions and reactions are continuous; and that the ingredients may be added in various places or at various points.

In this arrangement mixer 11$^a$ corresponds in function to mixer 11 in Figure 1; mixer 12$^a$ to mixer 12; and mixer 13$^a$ to 13. The mixture or slurry may be taken out of the circuit at any one of the points marked P from whence the mixture would be exposed to separation or filtration and go to production. The precipitating reagent, such as the $H_2SO_4$, may be added at either of the points marked A, for as has been stated above the system is cyclic.

From Figure 3 it will be seen that the solubility of the solid reaction product, which in this case is calcium sulfate, decreases rapidly with increasing concentrates of the liquid reagent which in this case is sulfuric acid. Therefore, if the pulp or slurry to which the $H_2SO_4$ is added already contains a substantial excess, the change in solubility due to the increase in $H_2SO_4$ will be very slight whereas if the pulp had contained zero or a very low excess, the change in solubility and therefore the urge to precipitate would be considerable.

Thus, in the manufacture of phosphoric acid or other soluble phosphatic mixture by the interaction of phosphate rock and sulfuric acid, with or without the addition or substitution of other acid such as nitric and/or soluble sulfates, during the major part of the reaction, the rock should be exposed to a solution containing sulfate (expressed as $H_2SO_4$) in total concentration less than 6% but equal to or greater than that corresponding to the normal solubility of calcium sulfate in the acid at the temperature used. This latter amount may be anywhere from 0.15% to 1.3% depending on the temperature and concentration of phosphoric acid present. By normal solubility is meant the solubility when excess of neither lime nor sulfate is present. Furthermore, the solution should contain at least the latter amount of sulfate when the $H_2SO_4$ is added. These conditions are satisfied by mixing the rock or rock slurry with a slurry of unseparated reaction products containing an amount of sulfate equal to or in excess of the amount required to be equivalent to the lime in the rock. After a reaction period, the production may be split out and the remainder of the slurry raised in sulfate concentration again by the addition of the required amount of sulfate, whereupon it may be used for attacking a new bath of rock. An alternative procedure is to add the sulfate before splitting out the production. Or, the sulfate may be added in two or more stages, taking out the production before or after any stage according to the requirements of the process. Adding the sulfate in two or more stages has certain advantages with regard to producing large crystals but is not essential to the proper performance of the process.

By thus keeping an excess of sulfate over CaO in the leaching solution, the conversion recovery of the $P_2O_5$ into a soluble form is increased. This is attributed to a lessening of the amount of $P_2O_5$ precipitated in the form of $CaHPO_4.2H_2O$ in solid solution in the gypsum. If sufficient volume of unseparated reaction products is used in the leaching cycle, the concentration of sulfate in the $H_3PO_4$ in the slurry may be kept low enough (below 6%) so that the rock is almost entirely or entirely decomposed, and this without excessive detention or grinding. It has been found that if the concentration of sulfate exceeds 6%, the precipitation is so rapid that the undecomposed particles of rock are coated with calcium sulfate which results in the coated rock particles being shielded from further attack whereupon the conversion of P₂O₅ to a soluble form is hindered and therefore poor. Thus, by closely controlling the concentration of H₂SO₄ in the leaching solution, a maximum conversion of P₂O₅ is obtained. By the return of finished reaction slurry into the first stages of the reaction, the crystals contained therein act as nuclei for the subsequent precipitation. By thus having a large amount of crystal surface present at all times supersaturation is slight and therefore the urge to precipitate, or form new crystal nuclei, is very much reduced. As has been pointed out, this results in building up a small number of large crystals rather than a very much larger number of very small crystals.

If the rock is ground wet in phosphoric acid, some of the rock will be decomposed and some gypsum precipitated and the sulfate concentration in the liquor will drop below that corresponding to the normal solubility of gypsum in the acid. This increases the insoluble loss and is perhaps slightly deleterious to the crystals but it is not serious since only a minor part of the rock is decomposed or dissolved in the wet grinding operation and a still smaller fraction of the gypsum precipitated. The operating convenience gained by grinding wet may easily offset any slight disadvantages it imposes on the extraction and crystal control. Furthermore, by holding the ratio of phosphoric acid to rock in the grinding operation as low as is consistent with smooth operation, the disadvantages are minimized.

In adding the sulfuric acid or other sulfate to the solution, it may or may not be previously mixed with returned weak or strong liquor resulting from the operations wherein the soluble phosphatic material is separated from the gypsum residue. Thus, this returned weak liquor which contributes the water required by the process, may be added with the sulfate and/or used in the grinding operation, and/or added by itself at any point in the process.

In general, therefore, this invention has been proposed by the use of which larger crystals than usual of a solid reaction product are formed by the interaction of a solid or less soluble reactant and a liquid or more soluble reactant. The invention may be said to comprise maintaining a small but definite excess of the more soluble reactant during the major part of the reaction so that the precipitation may proceed gradually. In particular, there should be an excess of the more soluble reactant (precipitating acid) present when a new portion of this reactant is added since this reactant exerts its full precipitation force at once, while the less soluble reactant rock must dissolve in order to exert any precipitation force and therefore exerts said force gradually. By having an excess of the more soluble reactant or precipitating acid present at the time a new portion is added, there is present in solution only a small amount of the precipitatable part of the less soluble reactant or rock and thus the urge to precipitate is much less than it would be otherwise, resulting in fewer new crystal nuclei and therefore larger crystals. But it is specified that when the sulfate is added to the solution, the solution should contain an amount of sulfate equal to or greater than the normal solubility of gypsum in the acid. Furthermore, it is revealed that a convenient method of attaining this end is to use unseparated reaction products to dilute the sulfate solution down to the desired concentration and expose the rock to this solution. A specific example hereof may be given as follows:

Example.—200 lbs. of phosphate rock were ground in 300 lbs. of 1.33 sp. g. phosphoric acid resulting from the washing of previously treated rock. This slurry was added to 13,050 lbs. of unseparated reaction products which consisted of 4,350 lbs. of gypsum suspended in 8,700 lbs. of acid analyzing 34% P₂O₅ and 2.5% total sulfate expressed as H₂SO₄. This amounts to an excess of about 180 lbs. of H₂SO₄ in the acid, since CaO is present in the acid in an amount equivalent to about 0.4% H₂SO₄. During the succeeding leaching period, the sulfate content of the acid was reduced to about 1.15% expressed as H₂SO₄ due to precipitation as CaSO₄.2H₂O by the lime resulting from the solution of the rock. At the close of the leaching period, which was carried on at a temperature of about 70° C. and which lasted approximately 30 minutes, 164 lbs. of 95% H₂SO₄ were added together with 236 lbs. of 1.33 sp. g. phosphoric acid. This raised the sulfate content of the acid in the slurry to 2.5% total sulfate expressed as H₂SO₄ and incidentally resulted in some further precipitation of gypsum due to depression of the solubility of the gypsum by the extra H₂SO₄. The amount of P₂O₅ converted into a soluble form by the above procedure was around 97% and the crystals filtered and washed well.

The advantages arising from the use of this process may be enumerated as follows: By seeding to provide a large amount of surface, supersaturation is lessened and so is any concentrated urge to precipitate. The limited or controlled urge to precipitate produces coarse crystals, and the urge to precipitate being kept uniform, produces crystals of substantially uniform characteristics and size.

The coarseness and uniformity of size of the crystals permit of their rapid sedimentation and filtration and also facilitate good washing by increasing the permeability of a mass thereof. Also it is possible by the use of this process to make commercially a stronger acid than heretofore. A stronger acid assures better rock attack. This in turn means that a coarser ground rock can be used with its consequent saving in expense. And again, stronger acid means that less agitator capacity is required. There is a lessened solid solution loss due to the maintained SO₄ excess, and due to the low average SO₄ concentration, there is no troublesome coating of the particles of rock by the precipitate forming thereon. And finally, the use of recirculation gives more uniform conditions.

We claim:

1. The cyclic method of controlling the size of crystals of the precipitated reaction-product calcium sulfate resulting from chemically reacting phosphate rock with a reagent having sulfate ions as a component thereof to produce a reaction product slurry comprising crystals of essentially calcium sulfate suspended in an aqueous solution of essentially phosphoric acid, which method comprises concurrently in the same zone dissolving the rock and precipitating the calcium sulfate in a suitably agitated reaction zone by introducing into said zone ground phosphate rock, water which may be in the form of diluted reaction-product solution which solution has been separated from reaction product slurry from a previous operation of the method, the sulfate ion containing reagent, and as a diluent for said reagent an amount of said reaction-product slurry from a previous operation of the method, the amount of said reaction-product slurry being varied with respect to the amount of said reagent to the end that larger crystals are produced as larger amounts of diluent are employed.

2. The cyclic method of controlling the size of crystals of the precipitated reaction-product calcium sulfate resulting from chemically reacting phosphate rock with sulfuric acid to produce a reaction-product slurry comprising crystals of essentially calcium sulfate suspended in an aqueous solution of essentially phosphoric acid, which method comprises concurrently in the same zone dissolving the rock and precipitating the calcium sulfate in a reaction zone by introducing into said zone water which may be in the form of diluted reaction-product solution which solution has been separated from reaction-product slurry from a previous operation of the method, ground phosphate rock, and a previously made mixture essentially comprising sulfuric acid, and, as a diluent for said acid, an amount of said reaction-product slurry from a previous operation of the method, the amount of said reaction-product slurry being varied with respect to the amount of sulfuric acid to the end that larger crystals are produced as larger amounts of diluent are employed.

3. The cyclic method of controlling the particle size of the precipitated solid reaction-product, calcium sulfate, resulting from the chemical reaction between phosphate rock and sulfuric acid to produce a reaction-product slurry of calcium sulphate particles suspended in an aqueous solution of essentially phosphoric acid, which method comprises concurrently in the same zone dissolving the rock and precipitating the calcium sulfate in a suitable reaction zone by introducing into said zone, water which may be in the form of diluted reaction-product solution which solution has been divided from reaction-product slurry from a previous operation of the method, ground phosphate rock and an amount of sulfuric acid and which amount of sulfuric acid is sufficient to provide $SO_4$ ions in excess of that required to fully react with the chemically basic reaction components of said amount of rock whereby the phosphoric acid solution portion of the resulting reaction-product slurry will contain $SO_4$ ions in excess of calcium ions and will thereby contain substantially a minimum of precipitatable calcium ions when said reaction-product slurry is used as a diluent as hereinafter provided for said amount of sulfuric acid having been previously intimately mixed with, as a diluent therefor, an amount of reaction-product slurry from a previous operation of the method said amount of reaction-product slurry being varied to the end that larger calcium sulfate particles are produced as larger amounts of diluent are employed.

4. The method of controlling crystal size in the making of phosphoric acid which comprises continuously dissolving phosphate rock in a rock solvent and exposing the resulting solution at the time of its formation to the action of a precipitating reagent having as a component thereof $H_2SO_4$, said reagent previous to its contact with the rock having been diluted with unseparated products of a similar reaction and thereby brought to a concentration of less than 6%.

5. The method of controlling crystal size in the making of phosphoric acid which comprises continuously dissolving phosphate rock in a rock solvent and exposing the resulting solution at the time of its formation to the action of a precipitating reagent having as a component thereof $H_2SO_4$, said reagent previous to its contact with the rock having been diluted to a concentration of less than 6% with unseparated products of a similar reaction and wherein said products contained an excess of precipitating reagent.

6. The method of making phosphoric acid which comprises concurrently in a combined dissolution and reaction zone dissolving phosphate rock in a solvent therefor and inducing a reaction between the dissolved phosphate rock and $H_2SO_4$, removing a quantity of the unseparated resulting reaction products, returning some of said products to the zone of the reaction, and adding the $H_2SO_4$ to said returned products to an extent that the returned products contain $H_2SO_4$ in excess of the requirements of the reaction.

7. The method of making phosphoric acid which comprises inducing a reaction between dissolved phosphate rock and sulphuric acid while maintaining the $SO_4$ ion concentration in the reaction mixture greater than the $SO_4$ equivalent of the CaO in the undissolved rock present and less than 6% during the major part of the reaction.

WILLIAM C. WEBER.
RALPH W. SHAFOR.
ELLIOTT J. ROBERTS.